UNITED STATES PATENT OFFICE.

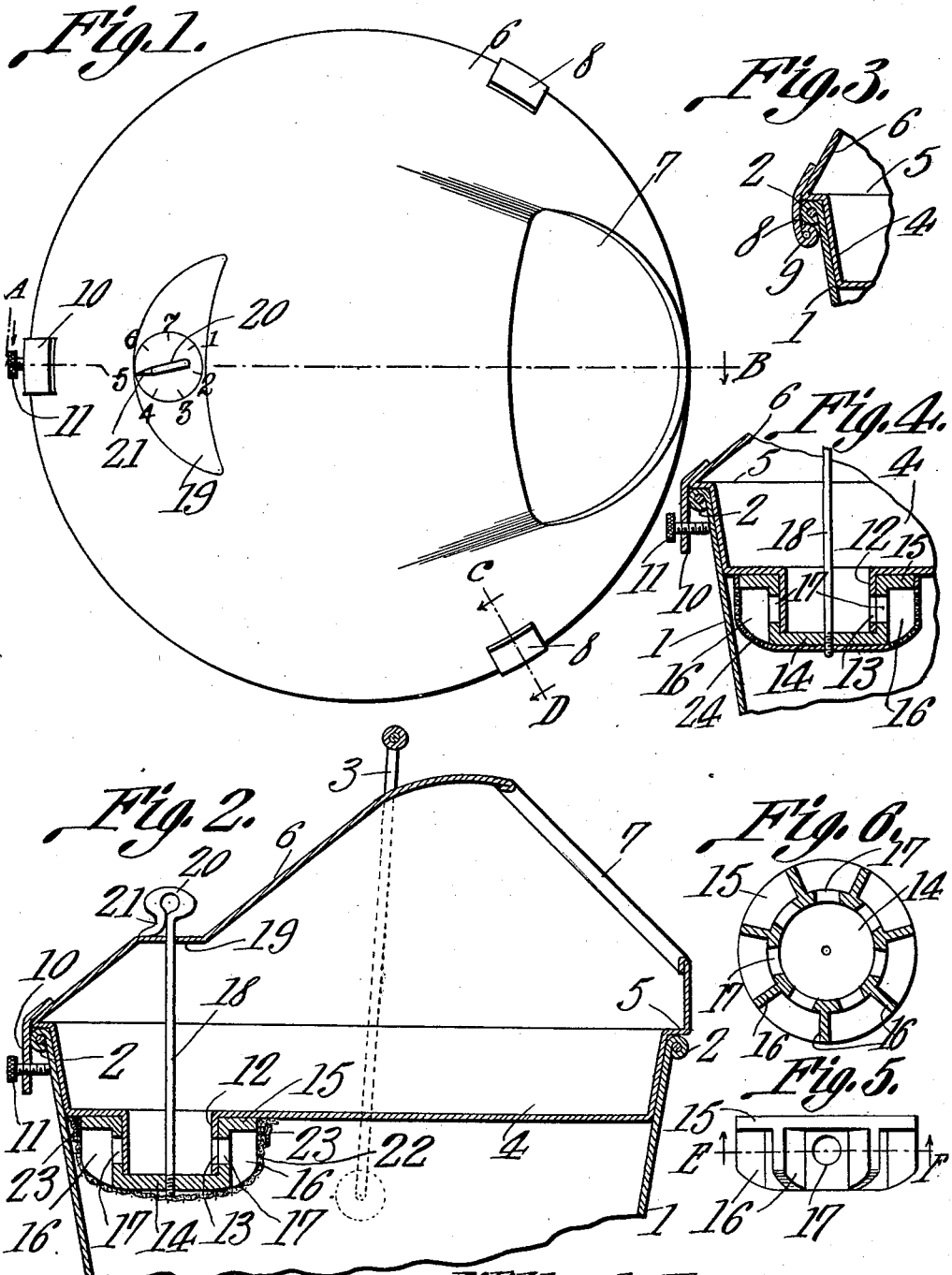

WILLARD JONES, OF AUBURN, MAINE.

ATTACHMENT FOR MILK-PAILS.

999,796.  Specification of Letters Patent.  Patented Aug. 8, 1911.

Application filed June 23, 1910. Serial No. 568,543.

*To all whom it may concern:*

Be it known that I, WILLARD JONES, a citizen of the United States, residing at Auburn, in the county of Androscoggin and State of Maine, have invented a new and useful Attachment for Milk-Pails, of which the following is a specification.

This invention relates to attachments for milk pails, its object being to provide a pail cover having a hood or shield adapted to protect the milk during its passage to the pail by preventing dirt from dropping thereinto.

A further object is to provide a pail cover having milk straining means combined therewith.

A further object is to provide a strainer utilizing a single cloth or the like which can be used for several successive milkings without necessitating the cleaning of the cloth, means being employed for directing the milk through separate portions of the cloth.

With these and other objects in view the invention consists in certain novel details of construction and combinations of parts hereinafter more fully described and pointed out in the claims.

In the accompanying drawings the preferred form of the invention has been shown. In said drawings:—Figure 1 is a plan view of the attachment. Fig. 2 is a section on line A—B Fig. 1. Fig. 3 is a section on line C—D Fig. 1. Fig. 4 is an enlarged section through the filtering portion of the device and showing a modified form of filtering material applied thereto. Fig. 5 is a side elevation of the adjustable filter casing. Fig. 6 is a section on line E—F Fig. 5.

Referring to the figures by characters of reference 1 designates an ordinary milk pail having a bead 2 extending around the upper edge thereof and there being a bail 3 connected to the pail and constituting means whereby the same can be carried.

The improvements constituting the present invention are in the form of a cover for the pail, said cover having a body portion 4 adapted to project into the upper end of the pail and to fit snugly against the wall thereof, there being an annular flange 5 extending around the body portion 4 and adapted to bear downwardly on the bead 2. A hood 6 extends upwardly from the flange 5 and is preferably formed with a rounded or substantially concavo-convex hood or shield overhanging the body portion 4 and provided, at one side, with an opening 7 into which the milk is adapted to flow directly from the cow.

Tongues 8 extend downwardly from the flange 5 and are provided with heads 9 at their lower ends adapted to engage the bead 2 as indicated in Fig. 3. Another tongue 10 extends downwardly from the flange 5 and carries a set screw 11 adapted to be screwed against the pail and to coöperate with the tongues 8 to secure the body portion 4 upon the pail.

An outlet tube 12 extends downwardly from the bottom portion of the body 4 at a point removed from the opening 7 and this tube has an opening 13 in the wall thereof. A cup-like filter body or casing 14 is mounted for rotation on the tubular extension 12 and has an annular flange 15 at the upper end thereof. Webs 16 are formed upon the outer face of the casing 14 and extend from the flange 15 to the lower end of the casing, the outer edge of these webs being preferably rounded. An opening 17 is formed in the casing 14 between every two webs 16. A plurality of cells is thus formed around the casing 14 between the webs, each cell having an opening 17 in one wall thereof.

A stem 18 is detachably secured to the center of the bottom of the casing 14 and extends upwardly through the tubular extension 12 and through a flattened portion 19 formed on the hood 6. The upper end of this stem is bent to form an eye 20 the terminal of the stem constituting an index 21 adapted to register with any one of a circular series of graduations which may be designated by numerals arranged in proper numerical succession.

A sheet of fabric such as indicated at 22 is adapted to be stretched across the bottom of the casing 14 and along the edges of the webs 16, the edge portion of this fabric being held tightly clamped against the flange 15 by means of a ring 23 or the like. It will therefore be seen that all of the cells are closed by this fabric.

When it is desired to use the device, the body portion 4 is secured in the pail 1 and the stem 18 is rotated until the index 21 points to the first graduation on the flat portion 19. One of the openings 17 will thus be brought into register with the opening 13 and when the milk flows through the opening 7 and into the body portion 4 it will pass outwardly through the extension 12 and the said openings 13 and 17 and into the cell with which the opening 17 communicates. The milk will leave this cell through that portion of the fabric closing the cell and will be filtered thereby before dropping into the pail 1. The parts can be left in this position until the milking operation has been completed. The stem 18 can then be rotated until the next graduation is indicated by the index. This will bring another opening 17 into register with the opening 13 and another portion of the cloth will be exposed for use as a filter. It will be seen of course that the life of the filter can be prolonged in proportion to the number of cells covered by it.

It is to be understood that where a cloth is employed to filter the milk, two or more layers may be provided, and, if desired, a filling of raw cotton may be interposed between the layers. This arrangement of materials is well known in this art and it is not deemed necessary to illustrate it in detail. Instead of utilizing a fabric however, perforated metal 24 may be placed upon the casing as indicated in Fig. 4 or a fine mesh wire gauze may be employed.

Various changes can of course be made in the construction and arrangement of the parts without departing from the spirit or sacrificing any of the advantages of the invention as defined in the appended claims.

What is claimed is:—

1. A device of the class described including a pail cover having a tubular outlet provided with a radial opening, a cup-like filter body mounted for rotation upon said tubular outlet and closing the end thereof, said body having cells in the peripheral portion thereof, each cell being open at the bottom and at its outer face and each cell having an opening in its inner face adapted to be brought into register with the opening in the tubular outlet, a filtering strip detachably secured to and around said filter body and closing the outer and bottom faces of the cells, and a manipulating member extending from said filter body and engaging the cover to support the body upon the tubular outlet.

2. A device of the class described including a pail cover having an outlet tube extending downwardly therefrom, a cup-like filter body mounted for rotation on said tube and closing the end of the tube, said tube having a radial outlet opening, there being peripheral non-communicating cells within the body and each cell being open at the bottom and its outer face, there being an opening in each cell designed to move in register with the opening in the tube, a stem for rotating the body, and a hood extending over the cover and having an inlet opening, said hood and stem coöperating to support the body upon the tube, there being coöperating means upon the stem and hood for indicating the position of the body relative to the opening in the tube.

In testimony that I claim the foregoing as my own, I have hereto affixed my signature in the presence of two witnesses.

WILLARD JONES.

Witnesses:
FRANK B. OCHSENREITER,
HERBERT D. LAWSON.

---

Copies of this patent may be obtained for five cents each, by addressing the "Commissioner of Patents, Washington, D. C."